United States Patent
Wartmann et al.

(10) Patent No.: US 9,151,936 B2
(45) Date of Patent: Oct. 6, 2015

(54) OPTICAL INSPECTION SYSTEM WITH A VARIATION SYSTEM CONSISTING OF FIVE LENS GROUPS FOR IMAGING AN OBJECT INTO INFINITY

(75) Inventors: Rolf Wartmann, Waake (DE); Kerstin Winkler, Goettingen (DE); Joerg Sprenger, Jena (DE)

(73) Assignee: Carl Zeiss Microscopy GmbH, Jena (DE)

( * ) Notice: Subject to any disclaimer, the term of this patent is extended or adjusted under 35 U.S.C. 154(b) by 162 days.

(21) Appl. No.: 13/989,398

(22) PCT Filed: Nov. 7, 2011

(86) PCT No.: PCT/EP2011/069508
§ 371 (c)(1),
(2), (4) Date: Aug. 9, 2013

(87) PCT Pub. No.: WO2012/069304
PCT Pub. Date: May 31, 2012

(65) Prior Publication Data
US 2013/0308201 A1   Nov. 21, 2013

(30) Foreign Application Priority Data

Nov. 24, 2010   (DE) .......................... 10 2010 061 862

(51) Int. Cl.
| | | |
|---|---|---|
| *G02B 3/02* | (2006.01) | |
| *G02B 15/14* | (2006.01) | |
| *G02B 15/173* | (2006.01) | |
| *G02B 13/22* | (2006.01) | |
| *G02B 21/02* | (2006.01) | |
| *G02B 21/22* | (2006.01) | |

(52) U.S. Cl.
CPC .............. *G02B 15/14* (2013.01); *G02B 15/173* (2013.01); *G02B 13/22* (2013.01); *G02B 21/025* (2013.01); *G02B 21/22* (2013.01)

(58) Field of Classification Search
CPC .................................................... G02B 13/0045
USPC .................................................... 359/713, 714
See application file for complete search history.

(56) References Cited

U.S. PATENT DOCUMENTS

| 5,659,426 A | 8/1997 | Aoki | |
|---|---|---|---|
| 6,335,833 B1 * | 1/2002 | Kawasaki | ..................... 359/686 |

FOREIGN PATENT DOCUMENTS

DE        10 2005 050 171 A1     4/2007

\* cited by examiner

*Primary Examiner* — James Jones
(74) *Attorney, Agent, or Firm* — Patterson Thuente Pedersen, P.A.

(57) ABSTRACT

The invention relates to an optical inspecting system designed to image an object to be inspected with a variable imaging scale, comprising a variation system for imaging the object into infinity, a lens group downstream of the variation system for imaging the object from infinity into the image plane of the whole system, and a light source for generating light in order to illuminate the object, means for imaging the illuminating light into the exit pupil of the variation system being provided in the airspace between the fifth lens group and the subsequent lens group. Of the five lens groups of the variation system, the first, second, and fourth lens groups, when seen in the imaging direction, are arranged in a movable manner in the direction of the optical axis, whereas the third and fifth lens groups are not movable.

12 Claims, 3 Drawing Sheets

OPTICAL INSPECTION SYSTEM WITH A VARIATION SYSTEM CONSISTING OF FIVE LENS GROUPS FOR IMAGING AN OBJECT INTO INFINITY

PRIORITY CLAIM

The present application is a National Phase entry of PCT Application No. PCT/EP2011/069508, filed Nov. 7, 2011, which claims priority from DE Application No. 10 2010 061 862.4, filed Nov. 24, 2010, said applications being hereby incorporated by reference herein in their entirety.

FIELD OF THE INVENTION

The invention relates to an optical inspection system, designed to image an object to be inspected with a variable imaging scale. It comprises a variation system consisting of several lens groups, a lens group downstream of the variation system for imaging the object into the image plane of the inspection system, and a light source for generating light in order to illuminate the object.

DESCRIPTION OF PRIOR ART

Optical inspection systems of this kind work fast and contact-free, and therefore are suitable especially for use in connection with digital image processing systems.

Their capabilities are limited, however, if object details of special interest are to be subjected to closer examination. If object details are additionally magnified with the systems known so far, only so-called empty magnifications are achieved, because the numerical aperture is not increased at the same time. Such magnification with unchanged aperture results in the disadvantage that the illuminance decreases considerably, both in the object and the image plane.

If, on top of that, the object is illuminated sideways, shadows in the object field will result. Object details within the shadow areas are difficult to resolve and therefore prone to misinterpretation.

DESCRIPTION OF THE INVENTION

Departing from this, the problem of the invention is to advance an optical inspection system of the kind mentioned in the beginning, in such a way that the advancement remedies the disadvantages of prior art. This should be achieved with the least possible technical outlay.

According to the invention, this problem is solved in such a way that the variation system consists of five lens groups and is designed to image the object into infinity, the lens group downstream of the variation system is intended for imaging the object from infinity into the image plane of the inspection system, and means for imaging the illuminating light into the exit pupil of the variation system are provided in the air space between the fifth lens group and the subsequent lens group.

Of the five lens groups of the variation system, the first, second and fourth lens groups (as seen in the imaging direction) are arranged so as to be movable along the optical axis, whereas the third and fifth lens group are not movable.

In other words: The problem is solved by means of a five-component variation system that is followed by a relatively large air space intended for feeding in the illumination, and another lens group. The first lens group of the variation system is movable along the optical axis; is in intended for setting the distance to the object. The second and fourth lens groups are movable as well; they effect a variation of the imaging scale by a factor of 16×...20×. Thanks to a special coupling of the movements of these two lens groups according to the invention, a variation of the position of the image plane is prevented. The variation system images the object to be inspected into infinity. Therefore, the subsequent largish air space is ideal for feeding in the illumination. The collecting lens group following the air space images the object from infinity into the image plane of the overall system.

Remark: In this invention description, the term "lens group" is used as a synonym of the term "lens component" commonly used in prior art.

The means for imaging the illuminating light into the exit pupil of the variation system, optionally provided between the last lens group of the variation system and the subsequent collecting lens group, the formation of disturbing shadows on the object field to be observed is prevented to the greatest possible extent, since the object is now illuminated from the direction of observation.

Furthermore, due the invention, the object-side numerical aperture increases with increasing imaging scale, which advantageously results in an increase in resolution as well as in illuminance in the object plane. The accompanying decrease in brightness in the image plane is but insignificant as compared with prior art.

The first lens group consists of a cemented doublet, the focal length of which is positive and between 160 mm and 125 mm long. Its free diameter is at least 40 mm. It preferably consists of a collecting lens of fluor crown glass and a diverging lens of short flint glass. Arranged after this cemented doublet in imaging direction may be a zero-refraction meniscus, which is preferably convex on the object side.

The second lens group has a negative focal length between 25.5 mm and 30.5 mm. Its movement range along the optical axis is preferably twice as long as the amount of its focal length.

The third lens group has a positive focal length between 43 mm and 44.5 mm. It consists of two or three collecting lenses, with at least two of these lenses consisting of fluor crown glass. Preferably, this lens group is an achromatically corrected one.

The fourth lens group has a negative focal length between 37 mm and 44 mm. It is designed as a cemented doublet comprising a collecting lens of short flint glass. Its movement range along the optical axis is preferably up to 1.35 times the amount of its focal length.

The fifth lens group has a positive focal length between 179 mm and 184 mm. It is designed as a cemented doublet comprising a collecting lens of fluor crown glass and a diverging lens of short flint glass.

Between the third lens group and the fourth lens group an aperture diaphragm is provided.

The collecting lens group following the variation system is a fully corrected, especially achromatized optical system having a light conductance of 1.15.

An essential advantage of the invented optical inspection system is that the imaging scale is variable by a factor of at least 16×. At the same time, a variation of the numerical aperture is achieved, so that a greater imaging scale also leads to an increase in resolution. The distance between the object to be inspected and the first lens group is freely selectable by means of internal focusing and thus permits of a further increase in imaging scale.

The system is further designed to permit the observation of relatively large objects, which can be observed from a distance of 1 m to 5 m. At the smallest magnification, the object is observed or photographed with a viewing angle of about 25°. On the image side, a light conductance (the product of numerical aperture and image size) of 0.575 to 1.15 is achieved, so that—in combination with a diffraction-limited, apochromatic correction—the capabilities of modern, high-resolution digital cameras can be exhausted to advantage.

In designing the behavior of the numerical aperture versus the various zoom positions, the inventors have found a balance between technical outlay and constancy of illuminance in the image plane. The ideal state would be a constant image-side aperture of 0.05, because this would result in constant resolving power on the image side. Under this condition, and given constant illuminance on the object side, illuminance on the image side would be constant as well. This, however, would only be achievable with an excessively high technical outlay. To avoid this outlay, the invented system is designed in such a way that the increase in the numerical aperture on the object side goes hand in hand with an increase in the illuminating aperture, and that, as a result, the intensity of object illumination increases.

In this way, a numerical aperture of less than 0.05 on the image side is sufficient to keep the illuminance constant even with increasing magnification.

According to the invention, the image-side numerical aperture decreases with the fourth root of the zoom factor V, and the illumination light only illuminates the pupil of the maximum magnification β'm. The illuminance in the image plane decreases with the square root of the zoom factor V. In this way, technical outlay and costs are kept low.

The gain in resolution achieved in varying the imaging scale follows the factor $$\{\text{fourth root}\}\sqrt{V^3}$$

with the zoom factor V resulting from the ratio of the magnification β' regarded and the lowest magnification β'0.

BRIEF DESCRIPTION OF THE DRAWINGS

Below, the invention will be explained in greater detail. In the accompanying drawings.

DETAILED DESCRIPTION OF THE DRAWINGS

Figure 1:
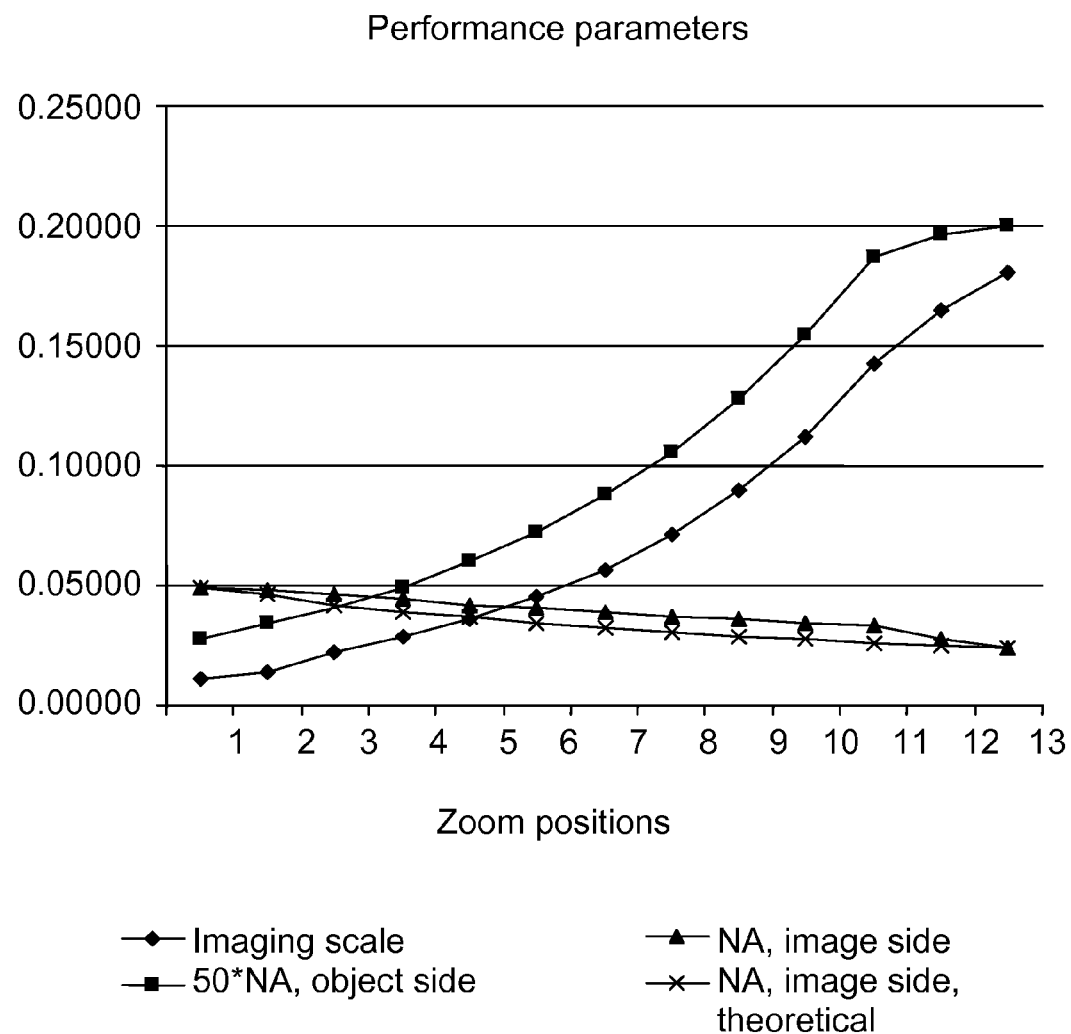
FIG. 1 is a graph of the performance parameters of the invented inspection system in terms of the numerical apertures on the object and image sides.

FIG. 1 is a graph of the numerical apertures of the invented inspection system on the object and image sides as functions of imaging scale.

Figure 2:
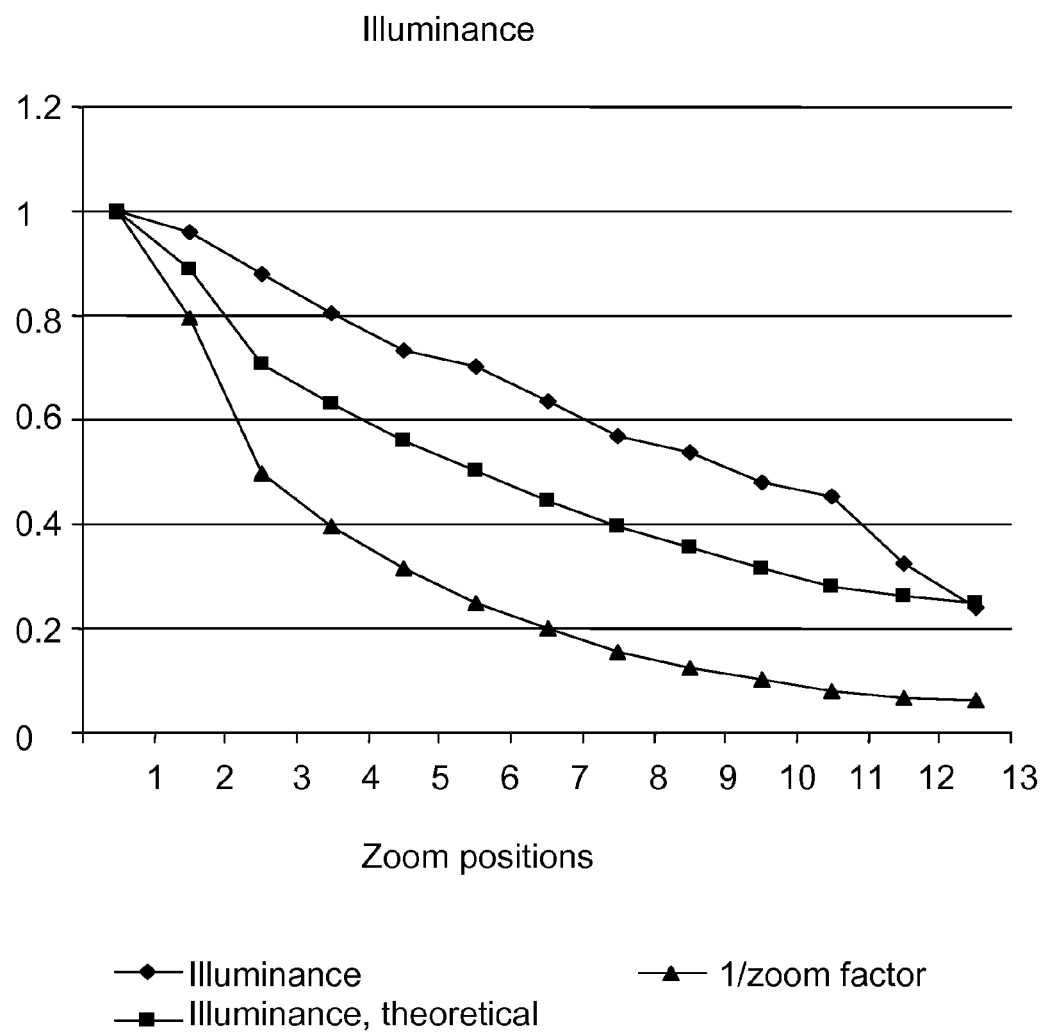
FIG. 2 is a graph of the illuminance in the image plane and the zoom factor V as a function of various zoom positions.

FIG. 2 shows the illuminance in the image plane and the zoom factor V as functions of the various zoom positions.

Figure 3:
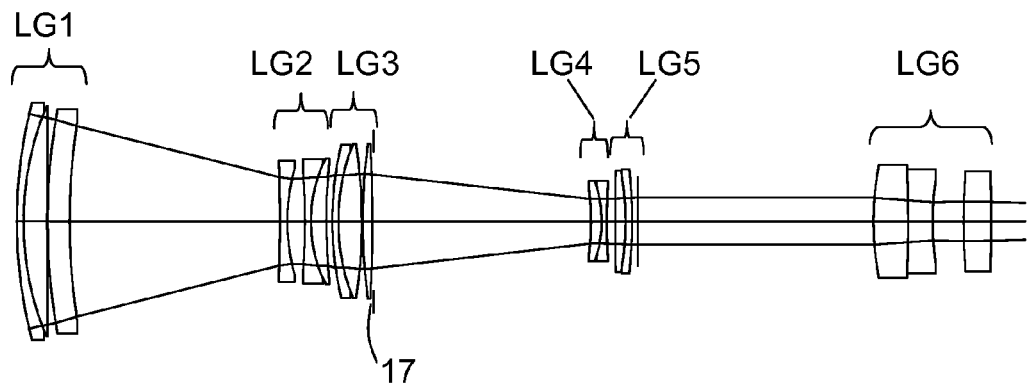
FIG. 3 illustrates the principle of a first exemplary embodiment.

In the first exemplary embodiment shown in FIG. 3, the lens groups (LG1 through LG6) are designed according to the design data according to Table 1 below, which lists, starting on the object-side end, the consecutive numbers of the optically effective surfaces of the lenses within the lens groups, the radiuses of these surfaces, the distances between the surfaces, and the refractive indices and Abbe numbers of the lens materials used:

TABLE 1

| No. | Radius | Distance | Refractive index $n_e$ | Abbe number $v_e$ |
|---|---|---|---|---|
| 1 | 57.576 | 2.0 | 1.7254 | 34.47 |
| 2 | 37.013 | 7.0 | 1.5302 | 76.58 |
| 3 | 2214.3 | 0.1 | | |
| 4 | 74.931 | 6.5 | 1.7545 | 35.1 |
| 5 | 76.45 | variable | | |
| 6 | infinite | variable | | |
| 7 | −193.73 | 2.2 | 1.4879 | 76.58 |
| 8 | 24.019 | 5.23 | | |
| 9 | −77.997 | 1.8 | 1.6203 | 63.10 |
| 10 | 17.841 | 4.5 | 1.7254 | 34.47 |
| 11 | 65.137 | variable | | |
| 12 | 39.228 | 1.8 | 1.8063 | 29.6 |
| 13 | 25.976 | 7.0 | 1.4398 | 94.6 |
| 14 | −58.156 | 0.1 | | |
| 15 | 64.554 | 3.0 | 1.4398 | 94.6 |
| 16 | −172.37 | 0.3 | | |
| 17 | diaphragm | variable | | |
| 18 | −33.59 | 3.2 | 1.7254 | 34.47 |
| 19 | −14.935 | 1.5 | 1.6203 | 63.10 |
| 20 | 74.944 | variable | | |
| 21 | 555.55 | 3.0 | 1.4398 | 94.6 |
| 22 | −32.737 | 2.0 | 1.7584 | 34.47 |
| 23 | −53.246 | 71.5 | | |
| 24 | 35.563 | 10.28 | 1.6229 | 60.08 |
| 25 | −131.46 | 7.26 | 1.8083 | 46.25 |
| 26 | 34.476 | 9.2 | | |
| 27 | 88.532 | 8.15 | 1.6229 | 60.08 |
| 28 | −199.53 | | | |

In this exemplary embodiment, the invented inspection system satisfies the following conditions:

Position of the object plane: 1 m to 5 m in front of the objective,
Position of the image plane: 150 mm behind the sixth lens group LG6,
Focusing distance (behind surface 5 in Table 1): 7.17 mm to 22.1 mm,
Movement range of the second lens group LG2 (surfaces 7 to 10 in Table 1): 0 mm to 55.2 mm,
Movement range of the fourth lens group LG4 (surfaces 18 to 20 in Table 1): 3 mm to 61.73 mm,
Distance between surfaces 6 and 12: 70.73 mm,
Distance between surfaces 17 and 21: 71.7 mm,
Image circle diameter: 23 mm,
Reciprocal magnification: −96 to −6 at the distance of 5 m between objective and object plane,
Image-side numerical aperture at minimum magnification β': 0.05,
Image-side numerical aperture at maximum magnification β': 0.025.

Figure 4:
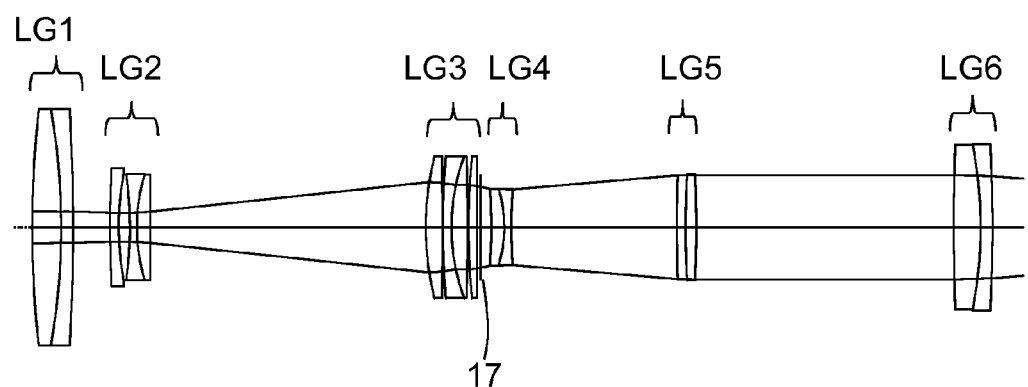
FIG. 4 illustrates the principle of a second exemplary embodiment.

In the second exemplary embodiment shown in FIG. 4, are designed with design data according to Table 2 below, which lists, starting on the object-side end, the consecutive numbers of the optically effective surfaces of the lenses within the lens groups, the radiuses of these surfaces, the distances between the surfaces, and the refractive indices and Abbe numbers of the lens materials used:

TABLE 2

| No. | Radius | Distance | Refractive index $n_e$ | Abbe number $v_e$ |
|---|---|---|---|---|
| 1 | 105.075 | 8.50 | 1.5302 | 76.58 |
| 2 | −67.802 | 3.50 | 1.6588 | 39.46 |
| 3 | −190.197 | variable | | |
| 4 | infinite | variable | | |
| 5 | 116.315 | 2.50 | 1.4398 | 94.6 |

TABLE 2-continued

| No. | Radius | Distance | Refractive index $n_e$ | Abbe number $v_e$ |
|---|---|---|---|---|
| 6 | 27.980 | 3.32 | | |
| 7 | −35.992 | 2.00 | 1.6940 | 54.48 |
| 8 | 18.836 | 3.80 | 1.7254 | 34.47 |
| 9 | 273.846 | variable | | |
| 10 | 29.853 | 4.90 | 1.4879 | 84.07 |
| 11 | −393.855 | 0.10 | | |
| 12 | 87.218 | 2.50 | 1.8881 | 40.52 |
| 13 | 20.982 | 4.80 | 1.4879 | 84.07 |
| 14 | −183.042 | 0.10 | | |
| 15 | 67.313 | 2.50 | 1.8881 | 40.52 |
| 16 | 1451.71 | 1.00 | | |
| 17 | diaphragm | variable | | |
| 18 | −45.316 | 3.80 | 1.7254 | 34.47 |
| 19 | −13.143 | 2.00 | 1.6808 | 54.92 |
| 20 | 50.479 | variable | | |
| 21 | 133.354 | 2.5 | 1.7434 | 32.0 |
| 22 | 79.34 | 3.2 | 1.4398 | 94.6 |
| 23 | −114.586 | 75.00 | | |
| 24 | 172.777 | 7.9 | 1.4879 | 84.07 |
| 25 | −43.089 | 3.5 | 1.5259 | 51.26 |
| 26 | −143.283 | | | |

In this second exemplary embodiment, the invented inspection system satisfies the following conditions:
Position of the object plane: 1 m to 5 m in front of the objective,
Position of the image plane: 176.39 mm behind the sixth lens group LG6,
Focusing distance (surface 3 in Table 2): 4.31 mm to 26.7 mm,
Movement range of the second lens group LG2 (surfaces 5 to 9 in Table 2): 7.4 mm to 85.83 mm,
Movement range of the fourth lens group LG4 (surfaces 18 to 20 in Table 2): 3.36 mm to 47.89 mm,
Distance between surfaces 4 and 10: 99.45 mm,
Distance between surfaces 17 and 21: 57.30 mm,
Image circle diameter: 23 mm,
Reciprocal magnification: −89 to −5.56 at the distance of 5 m between objective and object plane,
Image-side numerical aperture at minimum magnification β': 0.05,
Image-side numerical aperture at maximum magnification β': 0.025.

What is claimed is:

1. An optical inspection system, designed for imaging an object to be inspected with a variable imaging scale, comprising:
a variation system for imaging the object into infinity, the variation system consisting of, in order, a first lens group, a second lens group, a third lens group, a fourth lens group, and a fifth lens group, the first lens group being closest to the object, and the fifth lens group being furthest from the object;
a sixth lens group downstream of the variation system, for imaging the object from infinity into an image plane of an inspection system;
a light source for generating light in order to illuminate the object;
means for imaging the illuminating light into an exit pupil of the variation system in the air space between the fifth lens group and the sixth lens group;
wherein the first, second and fourth lens groups are arranged so as to be movable along an optical axis, whereas the third and fifth lens groups are not movable; and
further comprising an aperture diaphragm located between the fourth lens group and the fifth lens group.

2. The optical inspection system of claim 1, in which the first lens group includes a cemented doublet, the focal length of which is positive and between 160 mm and 125 mm long, and the free diameter of which is at least 40 mm, and in which the cemented doublet includes a collecting lens of fluor crown glass and a diverging lens of short flint glass.

3. The optical inspection system of claim 2, in which a zero-refraction meniscus is arranged downstream (in the direction of imaging) of the cemented doublet, the meniscus being convex on the object side.

4. The optical inspection system of claim 1, in which the second lens group has a negative focal length between 25.5 mm and 30.5 mm.

5. The optical inspection system of claim 1, in which the third lens group has a positive focal length between 43 mm and 44.5 mm and includes a plurality of collecting lenses, at least two of the collecting lenses consisting of fluor crown glass, with the third lens group being achromatically corrected.

6. The optical inspection system of claim 1, in which the fourth lens group has a negative focal length between 37 mm and 44 mm, includes a cemented doublet comprising a collecting lens of short flint glass, and has a movement range along the optical axis corresponding to 1.35 times the amount of its focal length.

7. The optical inspection system of claim 1, in which the fifth lens group has a positive focal length between 179 mm and 184 mm and includes a cemented doublet comprising a collecting lens of fluor crown glass and a diverging lens of short flint glass.

8. The optical inspection system of claim 1, in which the sixth lens group is a collecting, fully corrected, especially achromatized optical system with a light conductance of 1.15.

9. The optical inspection system of claim 1, in which the numerical aperture on the image side decreases with the fourth root of the zoom factor V, and in which the illumination only illuminates the pupil of the maximum magnification β'm, with the illuminance in the image plane decreasing with the square root of the zoom factor V.

10. The optical inspection system of claim 1, in which the first, second, third, fourth, fifth, and sixth lens groups are designed with design data according to the table below, which lists, starting on the object-side end, the consecutive numbers of the optically effective surfaces of the lenses within the lens groups, the radiuses of these surfaces, the distances between the surfaces, and the refractive indices and Abbe numbers of the lens materials used:

| No. | Radius | Distance | Refractive index $n_e$ | Abbe number $v_e$ |
|---|---|---|---|---|
| 1 | 57.576 | 2.0 | 1.7254 | 34.47 |
| 2 | 37.013 | 7.0 | 1.5302 | 76.58 |
| 3 | 2214.3 | 0.1 | | |
| 4 | 74.931 | 6.5 | 1.7545 | 35.1 |
| 5 | 76.45 | variable | | |
| 6 | infinite | variable | | |
| 7 | −193.73 | 2.2 | 1.4879 | 76.58 |
| 8 | 24.019 | 5.23 | | |
| 9 | −77.997 | 1.8 | 1.6203 | 63.10 |
| 10 | 17.841 | 4.5 | 1.7254 | 34.47 |
| 11 | 65.137 | variable | | |
| 12 | 39.228 | 1.8 | 1.8063 | 29.6 |
| 13 | 25.976 | 7.0 | 1.4398 | 94.6 |
| 14 | −58.156 | 0.1 | | |
| 15 | 64.554 | 3.0 | 1.4398 | 94.6 |
| 16 | −172.37 | 0.3 | | |
| 17 | diaphragm | variable | | |
| 18 | −33.59 | 3.2 | 1.7254 | 34.47 |

| No. | Radius | Distance | Refractive index $n_e$ | Abbe number $v_e$ |
| --- | --- | --- | --- | --- |
| 19 | −14.935 | 1.5 | 1.6203 | 63.10 |
| 20 | 74.944 | variable | | |
| 21 | 555.55 | 3.0 | 1.4398 | 94.6 |
| 22 | −32.737 | 2.0 | 1.7584 | 34.47 |
| 23 | −53.246 | 71.5 | | |
| 24 | 35.563 | 10.28 | 1.6229 | 60.08 |
| 25 | −131.46 | 7.26 | 1.8083 | 46.25 |
| 26 | 34.476 | 9.2 | | |
| 27 | 88.532 | 8.15 | 1.6229 | 60.08 |
| 28 | −199.53. | | | |

11. The optical inspection system of claim 1, in which the first, second, third, fourth, fifth, and sixth lens groups are designed with design data according to the table below, which lists, starting on the object-side end, the consecutive numbers of the optically effective surfaces of the lenses within the lens groups, the radiuses of these surfaces, the distances between the surfaces, and the refractive indices and Abbe numbers of the lens materials used:

| No. | Radius | Distance | Refractive index $n_e$ | Abbe number $v_e$ |
| --- | --- | --- | --- | --- |
| 1 | 105.075 | 8.50 | 1.5302 | 76.58 |
| 2 | −67.802 | 3.50 | 1.6588 | 39.46 |
| 3 | −190.197 | variable | | |
| 4 | infinite | variable | | |
| 5 | 116.315 | 2.50 | 1.4398 | 94.6 |
| 6 | 27.980 | 3.32 | | |
| 7 | −35.992 | 2.00 | 1.6940 | 54.48 |
| 8 | 18.836 | 3.80 | 1.7254 | 34.47 |
| 9 | 273.846 | variable | | |
| 10 | 29.853 | 4.90 | 1.4879 | 84.07 |
| 11 | −393.855 | 0.10 | | |
| 12 | 87.218 | 2.50 | 1.8881 | 40.52 |
| 13 | 20.982 | 4.80 | 1.4879 | 84.07 |
| 14 | −183.042 | 0.10 | | |
| 15 | 67.313 | 2.50 | 1.8881 | 40.52 |
| 16 | 1451.71 | 1.00 | | |
| 17 | diaphragm | variable | | |
| 18 | −45.316 | 3.80 | 1.7254 | 34.47 |
| 19 | −13.143 | 2.00 | 1.6808 | 54.92 |
| 20 | 50.479 | variable | | |
| 21 | 133.354 | 2.5 | 1.7434 | 32.0 |
| 22 | 79.34 | 3.2 | 1.4398 | 94.6 |
| 23 | −114.586 | 75.00 | | |
| 24 | 172.777 | 7.9 | 1.4879 | 84.07 |
| 25 | −43.089 | 3.5 | 1.5259 | 51.26 |
| 26 | −143.283. | | | |

12. The optical inspection system of claim 4, in which the second lens group further has a-movement range along the optical axis twice as long as an amount of the negative focal length.

\* \* \* \* \*

UNITED STATES PATENT AND TRADEMARK OFFICE
CERTIFICATE OF CORRECTION

| | | |
|---|---|---|
| PATENT NO. | : 9,151,936 B2 | Page 1 of 1 |
| APPLICATION NO. | : 13/989398 | |
| DATED | : October 6, 2015 | |
| INVENTOR(S) | : Rolf Wartmann et al. | |

It is certified that error appears in the above-identified patent and that said Letters Patent is hereby corrected as shown below:

On the title page, item 54:
Delete "WITH A VARIATION SYSTEM CONSISTING OF FIVE LENS GROUPS FOR IMAGING AN OBJECT INTO INFINITY"

In the specification:

Column 1, Lines 1-3:
Delete "WITH A VARIATION SYSTEM CONSISTING OF FIVE LENS GROUPS FOR IMAGING AN OBJECT INTO INFINITY"

Column 2, Line 1:
After "axis;" insert --and--
Delete "in"

Column 2, Line 22:
After "due" insert --to--

Column 3, Line 35:
Delete "{fourth root}" and insert --$^4$--

Column 4, Line 51:
After "4" insert --optical structures--

Signed and Sealed this
Ninth Day of August, 2016

Michelle K. Lee
*Director of the United States Patent and Trademark Office*